United States Patent
Tomonaga et al.

(10) Patent No.: US 12,552,764 B2
(45) Date of Patent: Feb. 17, 2026

(54) TRISULFIDE COMPOUND AND CLATHRATE THEREOF

(71) Applicant: Kyowa Pharma Chemical Co., Ltd., Takaoka (JP)

(72) Inventors: Shoichiro Tomonaga, Takaoka (JP); Takahiro Isobe, Takaoka (JP); Etsuo Ohshima, Takaoka (JP)

(73) Assignee: Kyowa Pharma Chemical Co., Ltd., Takaoka (JP)

( * ) Notice: Subject to any disclaimer, the term of this patent is extended or adjusted under 35 U.S.C. 154(b) by 486 days.

(21) Appl. No.: 18/042,693

(22) PCT Filed: Aug. 25, 2021

(86) PCT No.: PCT/JP2021/031222
§ 371 (c)(1),
(2) Date: Feb. 23, 2023

(87) PCT Pub. No.: WO2022/045212
PCT Pub. Date: Mar. 3, 2022

(65) Prior Publication Data
US 2023/0331692 A1    Oct. 19, 2023

(30) Foreign Application Priority Data
Aug. 27, 2020   (JP) .................. 2020-143645

(51) Int. Cl.
*C07D 341/00*    (2006.01)
*C08B 37/16*    (2006.01)

(52) U.S. Cl.
CPC ........ *C07D 341/00* (2013.01); *C08B 37/0015* (2013.01)

(58) Field of Classification Search
CPC .. A61K 47/6951; C08B 37/0015; C08L 15/16
See application file for complete search history.

(56) References Cited

U.S. PATENT DOCUMENTS

| | | | |
|---|---|---|---|
| 7,737,269 B2 * | 6/2010 | Reuscher ................ | A61P 25/00 549/39 |
| 2005/0215520 A1 | 9/2005 | Liu et al. | |

FOREIGN PATENT DOCUMENTS

| | | |
|---|---|---|
| CN | 101607955 A | 12/2009 |
| CN | 107652264 A | 2/2018 |
| CN | 111320603 A | 6/2020 |
| EP | 4342464 A1 | 3/2024 |
| JP | S37-007970 B1 | 7/1962 |
| JP | H07-188304 A | 7/1995 |
| JP | 2005-530866 A | 10/2005 |
| JP | 2019-534864 A | 12/2019 |

(Continued)

OTHER PUBLICATIONS

Tomonaga, Shoichiro et al., Bioscience, Biotechnology, and Biochemistry, "Solubilization and stabilization of lipoic acid trisulfide by creation of various beta-cyclodextrin clathrates", 2024, vol. 88, pp. 601-607 (Year: 2024).*

(Continued)

*Primary Examiner* — Bahar Craigo
(74) *Attorney, Agent, or Firm* — Leydig, Voit & Mayer, Ltd.

(57) ABSTRACT

A compound represented by Formula (1) or (3).

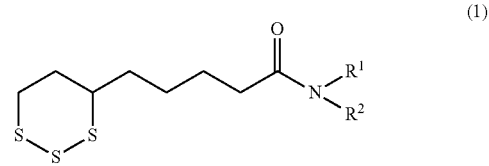

(1)

wherein $R^1$ and $R^2$ are each independently a hydrogen atom; a C1-6 alkyl group optionally having one or more substituents selected from the group consisting of a carboxy group and —$OR^5$; a C2-6 alkyl group having one or more substituents selected from the group consisting of —$NR^6R^7$ and —$N^+R^9R^{10}R^{11}$; or —$(CH_2CH_2O)_nR^8$;

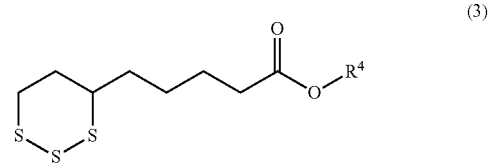

(3)

wherein $R^4$ is a C1-6 alkyl group having one or more substituents selected from the group consisting of a carboxy group and —$OR^5$; a C2-6 alkyl group having one or more substituents selected from the group consisting of —$NR^6R^7$ and —$N^+R^9R^{10}R^{11}$, or —$(CH_2CH_2O)_nR^8$;
wherein $R^5$, $R^6$, $R^7$, $R^8$, $R^9$, $R^{10}$ and $R^{11}$ are each independently a hydrogen atom or a C1-3 alkyl group; and n is an integer of 2 to 5.

15 Claims, 1 Drawing Sheet

(56) References Cited

FOREIGN PATENT DOCUMENTS

WO    WO 2003/095498 A1    11/2003
WO    WO 2018/055572 A1    3/2018

OTHER PUBLICATIONS

Japan Patent Office, International Search Report in International Patent Application No. PCT/JP2021/031222 (Nov. 16, 2021).

Japan Patent Office, International Preliminary Report on Patentability in International Patent Application No. PCT/JP2021/031222 (Feb. 28, 2023).

European Patent Office, Extended European Search Report in European Patent Application No. 21861635.7 (Apr. 3, 2025).

European Patent Office, Corrected European Search Opinion in European Patent Application No. 21861635.7 (Apr. 15, 2025).

Ikuta, "Physico-chemical analysis of R-alpha-lipoic acid/gamma-cyclodextrin complex and its application," Ph.D. Thesis for the Graduate School of Science and Technology at Kanazawa University (Apr. 2014).

\* cited by examiner

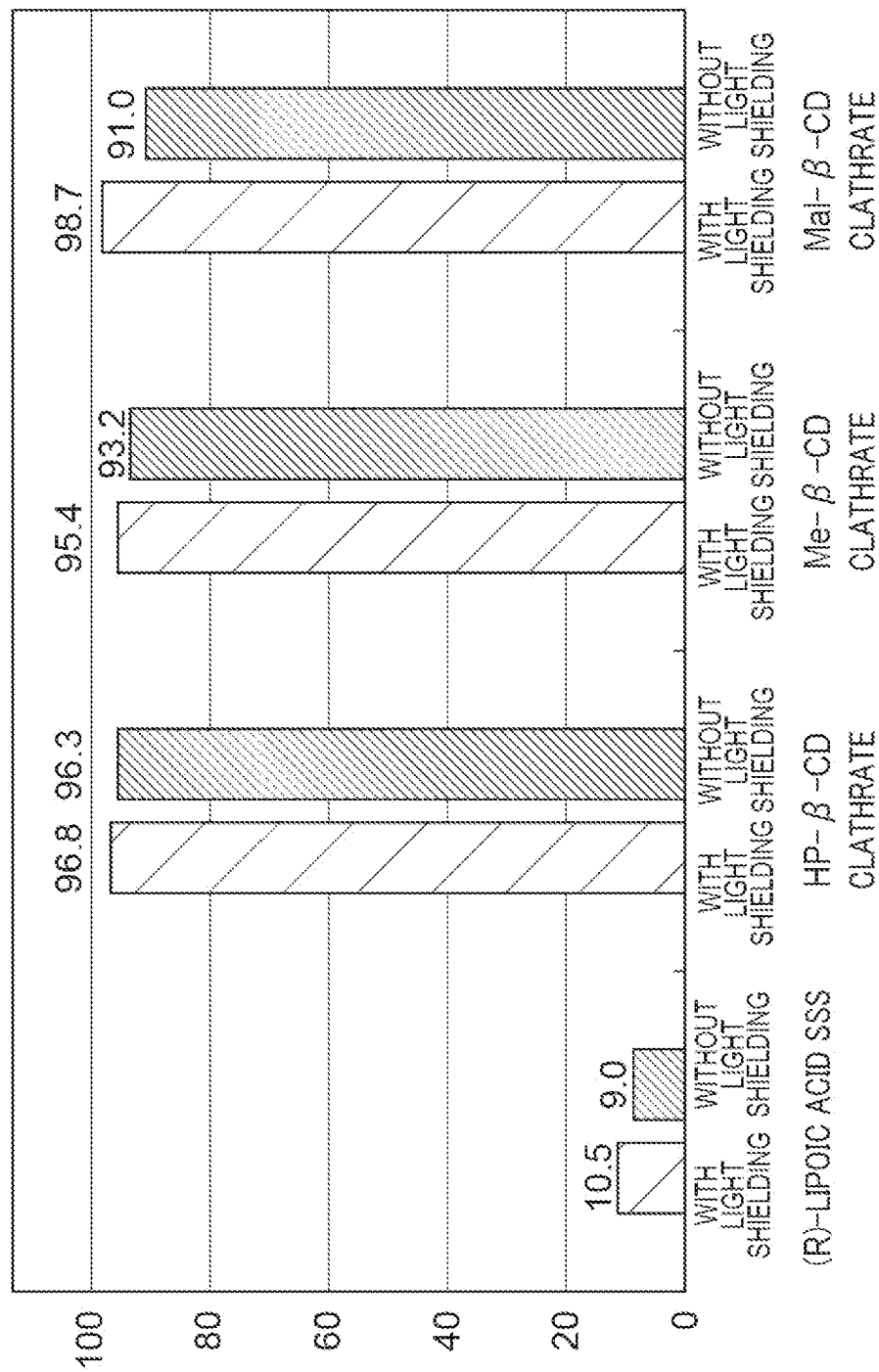

TRISULFIDE COMPOUND AND CLATHRATE THEREOF

TECHNICAL FIELD

The present invention relates to a trisulfide compound and a clathrate thereof.

BACKGROUND ART

A compound having a covalent bond structure consisting of three continuous sulfur atoms (—S—S—S—) is called a trisulfide compound. Trisulfide compounds are expected to have various physiologically active functions because they have oxidation-reduction ability depending on the possible valence of constituent sulfur atoms.

Patent Literature 1 discloses lipoic acid trisulfide obtained by trisulfidating α-lipoic acid used for treating diabetes or chronic hepatitis.

CITATION LIST

Patent Literature

[Patent Literature 1] CN. 107652264

SUMMARY OF INVENTION

Technical Problem

However, the trisulfide compound disclosed in Patent Literature 1 is poorly soluble in water.

An object of the present invention is to provide a novel trisulfide compound for solving the problem, and in particular, a cyclodextrin clathrate (hereinafter also referred to as a "CD clathrate" or simply a "clathrate") of a trisulfide compound, the cyclodextrin clathrate having excellent water solubility and stability.

Solution to Problem

The present inventors have made diligent efforts to solve the above-described problem, and have newly created a trisulfide compound having a carboxylic acid amide structure represented by Foimula (1) below. In addition, the present inventors have newly created a trisulfide compound which is represented by Formula (3) below and has an ester structure modified with a hydrophilic functional group. In addition, the present inventors have found that a CD clathrate of a trisulfide compound represented by Formula (1) or (2) below has excellent water solubility and stability, thus leading to realization of the present invention.

That is, the present invention relates to [1] to [8] below.
[1] A compound represented by Formula (1):

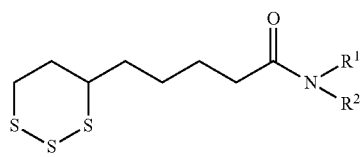

(1)

wherein $R^1$ and $R^2$ are each independently a hydrogen atom; a C1-6 alkyl group optionally having one or more substituents selected from the group consisting of a carboxy group and —$OR^5$; a C2-6 alkyl group having one or more substituents selected from the group consisting of —$NR^6R^7$ and —$N^+R^9R^{10}R^{11}$; or —$(CH_2CH_2O)_nR^8$; wherein $R^5$, $R^6$, $R^8$, $R^9$, $R^{10}$ and $R^{11}$ are each independently a hydrogen atom or a C1-3 alkyl group; and n is an integer of 2 to 5.
[2] The compound according to [1], wherein $R^1$ and $R^2$ are each a hydrogen atom.
[3] A compound represented by Formula (3):

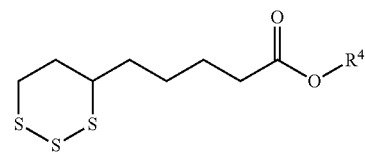

(3)

wherein $R^4$ is a C1-6 alkyl group having one or more substituents selected from the group consisting of a carboxy group and —$OR^5$; a C2-6 alkyl group having one or more substituents selected from the group consisting of —$NR^6R^7$ and —$N^+R^9R^{10}R^{11}$, or —$(CH_2CH_2O)_nR^8$; wherein $R^5$, $R^6$, $R^7$, $R^8$, $R^9$, $R^{10}$ and $R^{11}$ are each independently a hydrogen atom or a C1-3 alkyl group; and n is an integer of 2 to 5.
[4] A cyclodextrin clathrate, wherein at least one selected from the group consisting of a compound represented by Formula (1):

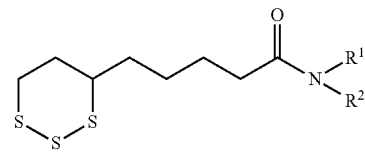

(1)

wherein $R^1$ and $R^2$ are each independently a hydrogen atom; a C1-6 alkyl group optionally having one or more substituents selected from the group consisting of a carboxy group and —$OR^5$; a C2-6 alkyl group having one or more substituents selected from the group consisting of —$NR^6R^7$ and —$N^+R^9R^{10}R^{11}$; or —$(CH_2CH_2O)_nR^8$; wherein $R^5$, $R^6$, $R^7$, $R^8$, $R^9$, $R^{10}$ and $R^{11}$ are each independently a hydrogen atom or a C1-3 alkyl group; and n is an integer of 2 to 5, a compound represented by Formula (2):

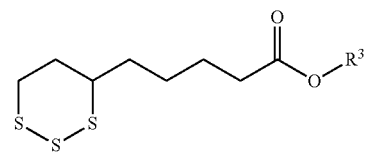

(2)

wherein $R^3$ is a hydrogen atom; a C1-6 alkyl group optionally having one or more substituents selected from the group consisting of a carboxy group and —$OR^5$; a C2-6 alkyl group having one or more substituents selected from the group consisting of —$NR^6R^7$ and —$N^+R^9R^{10}R^{11}$; or —$(CH_2CH_2O)_nR^8$; wherein $R^5$, $R^6$, $R^7$, $R^8$, $R^9$, $R^{10}$ and $R^{11}$ are each independently a hydrogen atom or a C1-3 alkyl group; and n is an integer of 2 to 5, and a salt of the compound represented by Formula (2):

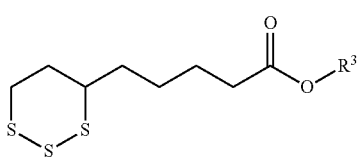

(2)

wherein R³ is as defined above, is included in a cyclodextrin.

[5] The clathrate according to [4], wherein the salt of the compound represented by Formula (2) comprises at least one selected from the group consisting of a salt with an alkali metal, a salt with an alkaline earth metal, an ammonium salt, a salt with an inorganic acid, and a salt with an organic acid.

[6] The clathrate according to [4] or [5], wherein the compound is the compound represented by Formula (2) and R³ is a hydrogen atom.

[7] The clathrate according to any one of [4] to [6], wherein the cyclodextrin is at least one selected from the group consisting of α-cyclodextrin, β-cyclodextrin, γ-cyclodextrin, and a derivative thereof.

[8] The clathrate according to any one of [4] to [7], wherein the cyclodextrin is at least one selected from the group consisting of β-cyclodextrin and a derivative thereof.

Advantageous Effects of Invention

According to the present invention, it is possible to provide a novel trisulfide compound. In addition, the CD clathrate of the trisulfide compound according to the present invention has excellent water solubility and stability. Accordingly, it is thought that problems such as restrictions on applicable pharmaceutical formulation and manifestation of individual differences in oral absorbability can be resolved in, for example, industrial applications such as pharmaceuticals. In addition, it is expected that the trisulfide compound and the CD clathrate of the trisulfide compound according to the present invention will have an active oxygen-eliminating action, a hydrogen sulfide-eliminating action, and the like.

BRIEF DESCRIPTION OF DRAWINGS

FIG. 1 is a graph showing results of stability tests of trisulfide compounds in CD clathrates.

DESCRIPTION OF EMBODIMENTS

A trisulfide compound according to one embodiment of the present invention is a compound represented by Formula (1) below.

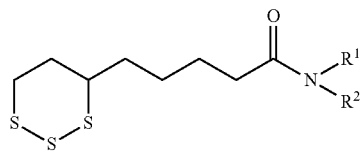

(1)

[In the formula, R¹ and R² each independently represent a hydrogen atom, a C1-6 alkyl group which may have one or more substituents selected from the group consisting of a carboxy group and —OR⁵, a C2-6 alkyl group having one or more substituents selected from the group consisting of —NR⁶R⁷ and —N⁺R⁹R¹⁰R¹¹ or —(CH₂CH₂O)$_n$R⁸; R⁵, R⁶, R⁷, R⁸, R⁹, R¹⁰ and R¹¹ are each independently a hydrogen atom or a C1-3 alkyl group; and n is an integer of 2 to 5.]

It is thought that, in the case where R¹ or R² is a C1-6 alkyl group which may have one or more substituents selected from the group consisting of a carboxy group and —OR⁵, a C2-6 alkyl group having one or more substituents selected from the group consisting of —NR⁶R⁷ and —N⁺R⁹R¹⁰R¹¹, or —(CH₂CH₂O)$_n$R⁸, hydrophilicity of the compound represented by Formula (1) is further improved.

In Formula (1), R¹ or R² may be a hydrogen atom and alkyl groups such as a methyl group, an ethyl group, a propyl group, a butyl group, a pentyl group, and a hexyl group. These alkyl groups may have one or more substituents selected from the group consisting of: a carboxy group; and substituents, such as a hydroxy group, a methoxy group, an ethoxy group, a propoxy group, and an isopropoxy group, represented by —OR⁵. In Formula (1), R¹ or R² may be alkyl groups such as an ethyl group, a propyl group, a butyl group, a pentyl group, and a hexyl group, and these alkyl groups may have one or more substituents selected from the group consisting of: substituents, such as an amino group and a dimethylamino group, represented by —NR⁶R⁷; and substituents, such as —N³⁰H₃, –N⁺(CH₃)₃, —N⁺(C₂H₆)₃, represented by —N⁺R⁹R¹⁰R¹¹. R¹ or R² may have, for example, one or both substituents as an amino group and a carboxy group. R¹ and R² may be, for example, a group represented by Formula (10) or (11) below (in the formulae, * represents a bond). R¹ and R² may be a group represented by —(CH₂CH₂O)$_n$R⁸ such as bis(2-ethoxyethyl) ether. Specific examples of the compound represented by Formula (1) below include a compound in which both R¹ and R² are hydrogen atoms, a compound in which R¹ is a hydrogen atom and R² is a group represented by Formula (10) below, and a compound in which R¹ is a hydrogen atom and R² is a group represented by Formula (11) below.

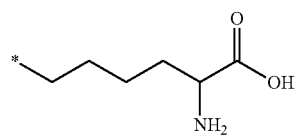

(10)

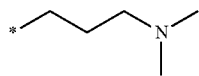

(11)

Compounds in the present specification may include optical isomers and racemates, but are not limited to any of them in the present invention. These may be either racemates or optically active substances, or may be a mixture comprising optically active substances at an arbitrary ratio.

The trisulfide compound represented by Formula (1) can be produced through a step of oxidizing a disulfide compound represented by Formula (1a) below with an oxidizing agent to obtain a sulfoxide compound (Step 1); and a step of allowing the obtained sulfoxide compound to react with a sulfur source to obtain a trisulfide compound (Step 2).

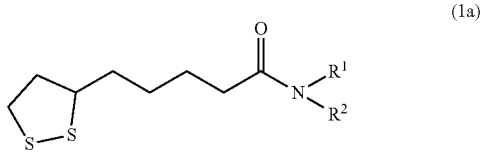

(1a)

[In the formula, $R^1$ and $R^2$ each independently represent a hydrogen atom, a C1-6 alkyl group which may have one or more substituents selected from the group consisting of a carboxy group and —$OR^5$, a C2-6 alkyl group having one or more substituents selected from the group consisting of —$NR^6R^7$ and —$N^+R^9R^{10}R^{11}$, or —$(CH_2CH_2O)_nR^8$; $R^5$, $R^6$, $R^7$, $R^8$, $R^9$, $R^{10}$ and $R^{11}$ are each independently a hydrogen atom or a C1-3 alkyl group; and n is an integer of 2 to 5.]

In the above-described production method, Step 1 and Step 2 may be performed in a one-pot reaction without isolating the sulfoxide compound.

A solvent used in Step 1 is not particularly limited as long as it dissolves a disulfide compound and an oxidizing agent and does not inhibit the oxidation reaction. Examples of such solvents include water, a sulfuric acid aqueous solution, an ethanol aqueous solution, and an acetonitrile aqueous solution, and water is preferable. The amount of solvent used in Step 1 can be1 mL to 500 mL, preferably 10 mL to 20 mL, with respect to 1 gram of the disulfide compound.

Examples of oxidizing agents used in Step 1 include potassium peroxymonosulfate (which has been sold under a trade name such as Oxone (registered trademark) or the like), peracetic acid, hydrogen peroxide, and sodium periodate. Hydrogen peroxide may be used with a catalytic amount of methyltrioxorhenium. Potassium peroxymonosulfate is a preferred oxidizing agent from the viewpoints of safety and costs. The amount of oxidizing agent used can be 0.8 equivalents to 2.0 equivalents, preferably 1.0 equivalent to 1.3 equivalents, with respect to 1 equivalent of the disulfide compound.

The reaction temperature in Step 1 can be −20° C. to 30° C., preferably −5° C. to 5° C.

The reaction time of Step 1 can be 5 minutes to 24 hours, preferably 0.5 hours to 2 hours.

A solvent used in Step 2 is not particularly limited as long as it dissolves a sulfoxide compound and a sulfur source and does not inhibit the reaction thereafter. Examples of such solvents include water, a sulfuric acid aqueous solution, an ethanol aqueous solution, and an acetonitrile aqueous solution, and water is preferable. The amount of solvent used in Step 2 can be 1 mL to 500 mL, preferably 10 mL to 20 mL, with respect to 1 gram of the sulfoxide compound.

Examples of sulfur sources used in Step 2 include sodium sulfide, potassium sulfide, sodium hydrosulfide, potassium hydrosulfide, and hydrogen sulfide. The amount of sulfur source used can be 0.5 equivalents to 4.0 equivalents, preferably 0.9 equivalents to 1.2 equivalents, with respect to 1 equivalent of the sulfoxide compound.

The reaction temperature in Step 2 can be −20° C. to 30° C., preferably −5° C. to 25° C.

The reaction time of Step 2 can be 10 minutes to 2 days, preferably 0.5 hours to 2 hours.

In a case where Step 1 and Step 2 are performed in a one-pot reaction, examples of reaction solvents include water, a sulfuric acid aqueous solution, an ethanol aqueous solution, and an acetonitrile aqueous solution, and water is preferable, and the amount of solvent can be 1 mL to 500 mL, preferably 10 mL to 20 mL, with respect to 1 gram of a disulfide compound. Examples of oxidizing agents used include potassium peroxymonosulfate, peracetic acid, hydrogen peroxide (which may be used with a catalytic amount of methyltrioxorhenium), and sodium periodate, preferably potassium peroxymonosulfate. The amount of oxidizing agent used can be 0.8 equivalents to 2.0 equivalents, preferably 1.0 equivalent to 1.3 equivalents, with respect to 1 equivalent of a disulfide compound. Examples of sulfur sources used include sodium sulfide, potassium sulfide, sodium hydrosulfide, potassium hydrosulfide, and hydrogen sulfide. The amount of sulfur source used can be 0.5 equivalents to 4.0 equivalents, preferably 0.9 equivalents to 1.2 equivalents, with respect to 1 equivalent of a disulfide compound. The reaction temperature can be −20° C. to 30° C., preferably −5° C. to 25° C. The reaction time can be 15 minutes to 2 days, preferably 1 hour to 4 hours.

In addition to Step 1 and Step 2, a step of protecting functional groups such as a hydroxy group, a carbonyl group, an amino group, and a carboxy group and a step of deprotecting the protected functional groups may be comprised as necessary. Protective groups for these functional groups and protection and deprotection reactions are well known to those skilled in the art, and appropriate protective groups and protection and deprotection reactions can be selected with reference to "Greene's Protective Groups in Organic Synthesis" and the like.

The disulfide compound represented by Formula (1a) can be produced by condensing lipoic acid and $NHR^1R^2$. Examples of solvents for a condensation reaction include dichloromethane, chloroform, and tetrahydrofuran, and tetrahydrofuran is preferable. The amount of solvent can be 1 mL to 200 mL, preferably 3 mL to 35 mL, with respect to 1 gram of the disulfide compound. Examples of condensing agents used include 1-(3-dimethylaminopropyl)-3-ethylcarbodiimide (EDC) and a salt thereof, N,N'-dicyclohexylcarbodiimide (DCC), diisopropylcarbodiimide (DIC) (in which N-hydroxysuccinimide (NHS) and 1-hydroxybenzotriazole (HOBt) may be used as additives), 4-dimethylaminopyridine (DMAP), and 1,1'-carbonyl diimidazole di(1H-imidazole-1-yl) methasone (CDI). The amount of condensing agent used can be 0.8 equivalents to 2.0 equivalents, preferably 1.0 equivalent to 1.5 equivalents, with respect to 1 equivalent of the disulfide compound. The reaction temperature can be −10° C. to 40° C., preferably 15° C. to 25° C. The reaction time can be 1 hour to 3 days, preferably 1 hour to 24 hours.

The trisulfide compound represented by Formula (1) can also be produced by condensing lipoic acid trisulfide and $NHR^1R^2$. The conditions of condensation are the same as above.

A trisulfide compound according to one embodiment of the present invention is a compound represented by Formula (3) below.

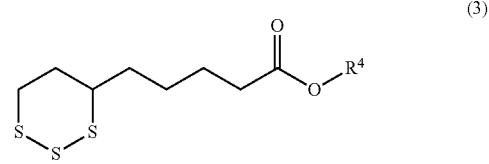

(3)

[In the formula, $R^4$ represents a C1-6 alkyl group having one or more substituents selected from the group consisting of a carboxy group and —$OR^5$, a C2-6 alkyl group having one or more substituents selected from the group consisting of —$NR^6R^7$ and —$N^+R^9R^{10}R^{11}$, or —$(CH_2CH_2O)_nR^8$; $R^5$, $R^6$, $R^7$, $R^8$, $R^9$, $R^{10}$ and $R^{11}$ each independently represent a hydrogen atom or a C1-3 alkyl group; and n represents an integer of 2 to 5.]

It is thought that the compound represented by Formula (3) has favorable hydrophilicity.

In Formula (3), $R^4$ may be alkyl groups such as a methyl group, an ethyl group, a propyl group, a butyl group, a pentyl group, and a hexyl group, and these alkyl groups have substituents represented by —$OR^5$. The substituents represented by —$OR^5$ are the same as above. In Formula (3), $R^4$ may be alkyl groups such as an ethyl group, a propyl group, a butyl group, a pentyl group, and a hexyl group, and these alkyl groups have one or more substituents selected from the group consisting of —$NR^6R^7$ and —$N^+R^9R^{10}R^{11}$. The substituents represented by —$NR^6R^7$ are the same as above. The substituents represented by —$N^+R^9R^{10}R^{11}$ are the same as above. In Formula (3), $R^4$ may be a group represented by —$(CH_2CH_2O)_nR^8$, and the group represented by —$(CH_2CH_2O)_nR^8$ is the same as above. In Formula (3), $R^4$ may be, for example, a group represented by Formula (30) or (31) below (in the formulae, * represents a bond).

Specific examples of the compound represented by Formula (3) include a compound in which $R^3$ is a group represented by Formula (30) below and a compound in which $R^3$ is a group represented by Formula (31) below.

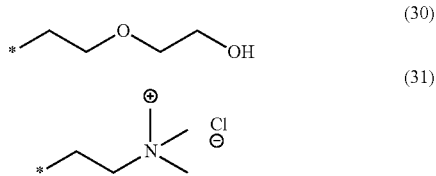

(30)

(31)

The compound represented by Formula (3) can be produced in the same manner as in a case where $R^3$ is a C1-6 alkyl group having one or more substituents selected from the group consisting of a carboxy group and —$OR^5$, a C2-6 alkyl group having one or more substituents selected from the group consisting of —$NR^6R^7$ and —$N^+R^9R^{10}R^{11}$, or —$(CH_2CH_2O)_nR^8$ in the compound represented by Formula (2).

In a CD clathrate of a trisulfide compound according to another embodiment of the present invention, at least one selected from the group consisting of a compound represented by Formula (1) above, a compound represented by Formula (2) below, and a salt of the compound represented by Formula (2) below is included in a cyclodextrin.

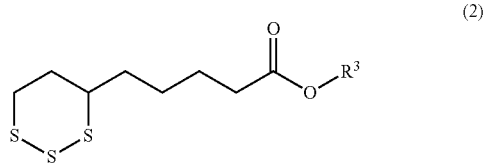

(2)

[In the formula, $R^3$ represents a hydrogen atom, a C1-6 alkyl group which may have one or more substituents selected from the group consisting of a carboxy group and —$OR^5$, a C2-6 alkyl group having one or more substituents selected from the group consisting of —$NR^6R^7$ and —$N^+R^9R^{10}R^{11}$, or —$(CH_2CH_2O)_nR^8$; $R^5$, $R^6$, $R^7$, $R^8$, $R^9$, $R^{10}$ and $R^{11}$ each independently represent a hydrogen atom or a C1-3 alkyl group; and n represents an integer of 2 to 5.]

In Formula (2), $R^3$ may be, for example, a hydrogen atom, a methyl group, an ethyl group, a propyl group, a butyl group, a pentyl group, and a hexyl group, and may be a group represented by $R^4$ in Formula (3).

The trisulfide compound represented by Formula (2) in which $R^3$ is a C1-6 alkyl group which may have one or more substituents selected from the group consisting of a carboxy group and —$OR^5$, a C2-6 alkyl group having one or more substituents selected from the group consisting of —$NR^6R^7$ and —$N^+R^9R^{10}R^{11}$, or —$(CH_2CH_2O)_nR^8$ can be produced through: a step of oxidizing a disulfide compound represented by Formula (2a) below with an oxidizing agent to obtain a sulfoxide compound (Step 1); and a step of allowing the obtained sulfoxide compound to react with a sulfur source to obtain a trisulfide compound (Step 2). In addition to Step 1 and Step 2, a step of protecting functional groups such as a hydroxy group, a carbonyl group, an amino group, and a carboxy group and a step of deprotecting the protected functional groups may be comprised as necessary. The conditions of reaction are the same as above.

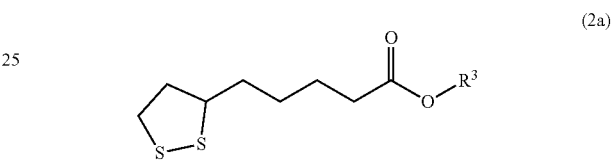

(2a)

[In the formula, $R^3$ represents a hydrogen atom, a C1-6 alkyl group which may have one or more substituents selected from the group consisting of a carboxy group and —$OR^5$, a C2-6 alkyl group having one or more substituents selected from the group consisting of —$NR^6R^7$ and —$N^+R^9R^{10}R^{11}$; or —$(CH_2CH_2O)_nR^8$; $R^5$, $R^6$, $R^7$, $R^8$, $R^9$, $R^{10}$ and $R^{11}$ each independently represent a hydrogen atom or a C1-3 alkyl group; and n represents an integer of 2 to 5.]

The disulfide compound represented by Formula (2a) can be produced by condensing lipoic acid and $R^3OH$. The conditions of condensation are the same as above.

The trisulfide compound represented by Formula (2) in which $R^3$ is a C1-6 alkyl group having one or more substituents selected from the group consisting of a carboxy group and —$OR^5$, a C2-6 alkyl group having one or more substituents selected from the group consisting of —$NR^6R^7$ and —$N^+R^9R^{10}R^{11}$, or —$(CH_2CH_2O)_nR^8$ can also be produced by condensing lipoic acid trisulfide and R3OH. The conditions of condensation are the same as above.

A salt of the compound represented by Formula (2) above may be a pharmacologically acceptable salt, and examples thereof include salts with alkali metals such as sodium and potassium, salts with alkaline earth metals such as calcium and magnesium, ammonium salt, salts with inorganic acids such as hydrobromic acid, hydrobromic acid, sulfuric acid, nitric acid, and phosphoric acid, and salts with organic acids such as acetic acid, succinic acid, fumaric acid, maleic acid, tartaric acid, citric acid, lactic acid, stearic acid, benzoic acid, methanesulfonic acid, ethanesulfonic acid, and p-toluenesulfonic acid. These salts can be converted from lipoic acid trisulfide according to a usual method.

Cyclodextrins may be α-cyclodextrin, β-cyclodextrin, γ-cyclodextrin, or derivatives thereof. Here, "derivatives" mean that a hydrogen atom of at least one hydroxyl group in each cyclodextrin is substituted with a saccharide or an alkyl group which may have a substituent. As the cyclodextrin derivatives, it is possible to use, for example, methyl-α- cyclodextrin, methyl-β-cyclodextrin, methyl-γ-cyclodextrin, dimethyl-α-cyclodextrin, dimethyl-β-cyclodextrin, dimethyl-γ-cyclodextrin, hydroxyethyl-α-cyclodextrin, hydroxyethyl-β-cyclodextrin, hydroxyethyl-γ-cyclodextrin, 2-hydroxypropyl-α-cyclodextrin, 2-hydroxypropyl-β-cyclodextrin, 2-hydroxypropyl-γ-cyclodextrin, glucosyl-α-cyclodextrin, glucosyl-β-cyclodextrin, glucosyl-γ-cyclodextrin, maltosyl-α-cyclodextrin, maltosyl-β-cyclodextrin, maltosyl-γ-cyclodextrin, sulfobutyl ether-α-cyclodextrin, sulfobutyl ether-β-cyclodextrin, and sulfobutyl ether-γ-cyclodextrin.

A CD clathrate can be produced through a step of dissolving a cyclodextrin in a solvent (Step a), a step of charging a trisulfide compound to the obtained solution and stirring the mixture (Step b), and a step of filtering the stirred solution, washing the solvent used in Step a with the same solvent, and freezing the filtrate to perform freeze-drying (Step c). The filtration and washing operation in Step c may be omitted.

The solvent used in Step a is preferably water.

The amount of solvent used in Step a can be 1 to 350 mL, preferably 1 to 80 mL, with respect to 1 gram of the cyclodextrin.

In Step b, the mass ratio of the cyclodextrin to the trisulfide compound can be 2 to 20, preferably 5 to 16.5.

The stirring temperature in Step b can be 20° C. to 50° C., and may be room temperature.

The stirring time in Step b can be 0.25 to 40 hours, preferably 2 to 35 hours.

In Step b, after charging a trisulfide compound, the same solvent as that used in Step a may be added before stirring. The amount of solvent at this time can be 0 to 30 mL, preferably 0 to 20 mL, with respect to 1 gram of the cyclodextrin.

The amount of solvent used in Step c can be 0 to 150 mL, preferably 0 to 20 mL, with respect to 1 gram of the cyclodextrin.

The freezing temperature in Step c can be −30° C. to −20° C., preferably −20° C.

The freezing time in Step c can be 10 to 50 hours.

The freeze-drying in Step c can be performed at an absolute pressure of 20 to 100 Pa and an external temperature of 10° C. to 40° C., preferably 20° C.

The freeze-drying time in Step c can be 1 to 5 days.

The trisulfide compound or the CD clathrate of the trisulfide compound according to the present invention can be used as a pharmaceutical composition by incorporating pharmacologically acceptable additives as necessary.

A pharmaceutical composition comprising the trisulfide compound or the CD clathrate of the trisulfide compound according to the present invention can be formulated as an injection, an oral agent, an eye drop, a coating agent, or a suppository. Examples of injections include subcutaneous injections, intramuscular injections, intravenous injections, and intraperitoneal injections. Examples of oral agents include tablets, granules, fine granules, powders, and capsules. Examples of eye drops include aqueous eye drops and oily eye drops. Examples of ointments include plaster, ointment, cream, and lotion. Examples of suppositories include oleaginous base agent-type suppositories and water-soluble base material-type suppositories. Examples of additives include stabilizers such as saccharides (sucrose, trehalose, maltose, lactose and the like), sugar alcohols (sorbitol and the like), amino acids (L-arginine and the like), water-soluble polymers (hydroxyethyl starch (HES), polyvinyl pyrrolidone (PVP) and the like), and nonionic surfactants (polysorbate, poloxamers and the like); pH adjusters such as sodium phosphate buffer solutions and histidine buffer solutions; isotonic agents such as sodium chloride; and excipients such as mannitol, glycine, table salt, and sucrose.

Examples of preferred embodiments of the present invention include [Embodiment 1] to [Embodiment 7] below.

[Embodiment 1] A compound represented by Formula (1) below.

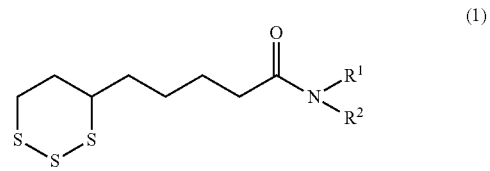

(1)

[In the formula, $R^1$ and $R^2$ each independently represent a hydrogen atom or a C1-6 alkyl group, and the alkyl group may have one or more substituents selected from the group consisting of an amino group and a carboxy group.]

[Embodiment 2] The compound according to [Embodiment 1], in which $R^1$ and $R^2$ are hydrogen atoms.

[Embodiment 3] A cyclodextrin clathrate in which at least one selected from the group consisting of a compound represented by Formula (1) below, a compound represented by Formula (2) below, and a salt of the compound represented by Formula (2) below is included in a cyclodextrin.

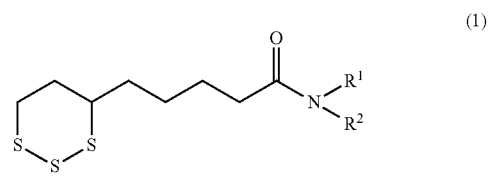

(1)

[In the formula, $R^1$ and $R^2$ each independently represent a hydrogen atom or a C1-6 alkyl group, and the alkyl group may have one or more substituents selected from the group consisting of an amino group and a carboxy group.]

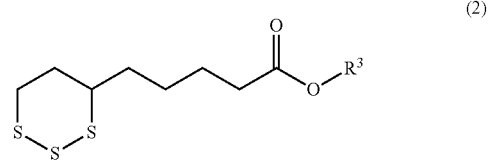

(2)

[In the formula, $R^3$ represents a hydrogen atom or a C1-6 alkyl group.]

[Embodiment 4] The clathrate according to [Embodiment 3], in which the salt of the compound represented by Formula (2) below comprises at least one selected from the group consisting of a salt with an alkali metal, a salt with an alkaline earth metal, and an ammonium salt.

[Embodiment 5] The clathrate according to [Embodiment 3] or [Embodiment 4], in which the compound is the compound represented by Formula (2) and $R^3$ is a hydrogen atom.

[Embodiment 6] The clathrate according to any one of [Embodiment 3] to [Embodiment 5], in which the cyclodextrin is at least one selected from the group consisting of α-cyclodextrin, β-cyclodextrin, γ-cyclodextrin, and derivatives thereof.

[Embodiment 7] The clathrate according to any one of [Embodiment 3] to [Embodiment 6], in which the cyclodextrin is at least one selected from the group consisting of β-cyclodextrin and derivatives thereof

EXAMPLES

Hereinafter, the present invention will be described in detail with reference to examples. However, the present invention is not limited by these examples.

Example 1

<Production of (R)-Lipoic Acid Trisulfide>

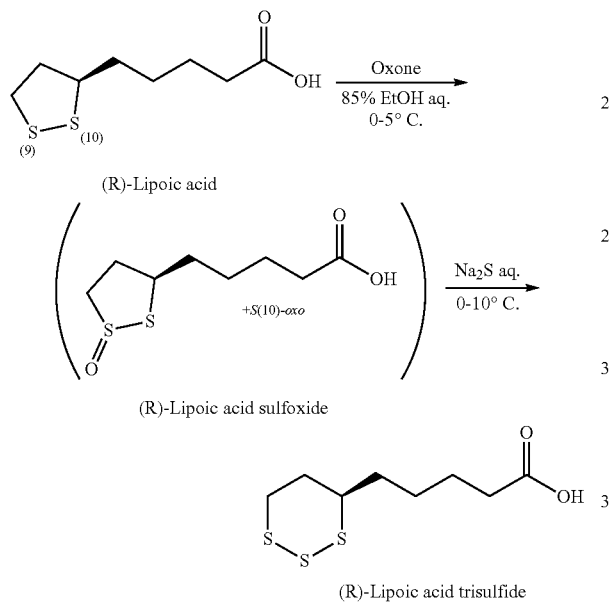

24.38 g (118.17 mmol) of (R)-α-lipoic acid and 488 mL (20.0 v/w) of a 75% ethanol aqueous solution were added to a 200 mL four-neck flask. After confirming that the contents of the flask had dissolved, the internal temperature was cooled to 0° C. Oxone (registered trademark) (41.40 g, 124.20 mmol, 1.05 equivalents) was added thereto in two portions to cause a reaction for about 50 minutes. An insoluble substance in the reaction solution was removed by filtration and then washed with 65 mL (2.67 v/w) of ethanol. 400 mL (206.93 mmol, 1.75 equivalents) of a Na₂S aqueous solution (70.70 g of Na₂S·9H₂O dissolved in 569 mL of water) was added dropwise to the filtrate and wash liquid at an internal temperature of 2° C. to 6° C. over about 2.5 hours (during the dropwise addition and the reaction, a 3 mol/L sulfuric acid aqueous solution was used to control the pH at 6 to 7, and the total amount thereof used was 14 mL). After causing a reaction at an internal temperature of 3° C. at a pH 7 for about 50 minutes, 41 mL (1.7 v/w) of a 3 mol/L sulfuric acid aqueous solution was added dropwise thereto to adjust the pH to 1.3. Next, 320 mL (13.1 v/w) of water and 320 mL (13.1 v/w) of ethyl acetate were added thereto to perform extraction with ethyl acetate. The aqueous layer was extracted four times with 160 mL (6.6 v/w) of ethyl acetate, and organic layers were combined and concentrated under reduced pressure at an external temperature of 30° C. Ethanol was added to the concentrate to dissolve it, followed by column purification with ODS. The fraction was concentrated under reduced pressure at an external temperature of 30° C. and then dried with an oil pump to obtain 10.69 g of (R)-lipoic acid trisulfide (44.84 mmol, yield 38%, HPLC purity of 99.7%, white solid).

<Production of (R)-Lipoamide Trisulfide>

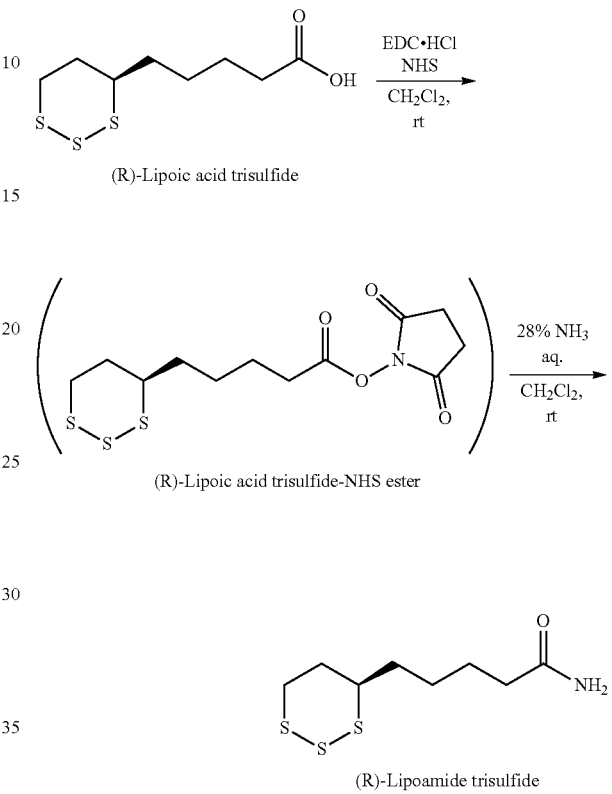

2.00 g (8.39 mmol) of (R)-lipoic acid trisulfide and 65 mL (32.5 v/w) of methylene chloride were added to a 200 mL four-neck flask. After confirming that the contents of the flask had dissolved, 2.07 g (10.77 mmol, 1.28 equivalents) of 1-(3-dimethylaminopropyl)-3-ethylcarbodiimide hydrochloride (EDC·HCl) and 1.42 g (12.33 mmol, 1.47 equivalents) of N-hydroxysuccinimide (NHS) were added thereto. After replacing the air in the flask with nitrogen, a reaction was carried out at room temperature for about 8 hours. Next, 2.28 mL (33.74 mmol, 4.02 equivalents) of 28% aqueous ammonia was added dropwise at room temperature over 5 minutes and allowed to react overnight. Thereafter, at room temperature, 60 mL of water (30.0 v/w) was added thereto and the mixture was subjected to liquid separation. Then, the organic layer was washed three times with 60 mL (30.0 v/w) of a 2.5% sodium hydrogen carbonate aqueous solution and additionally washed four times with 60 mL of water (30.0 v/w). Thereafter, the organic layer after washing was concentrated under reduced pressure at an external temperature of 25° C., and then dried with an oil pump to obtain 1.93 g of (R)-lipoamide trisulfide (8.13 mmol, yield 97%, HPLC purity of 99.6%, white solid).

¹H-NMR: (CDCl₃, 400 MHz) δ (ppm)=5.36 (bs, 2H), 3.33 (m, 1H), 3.13 (m, 2H), 2.22 (m, 3H), 1.89 (m, 1H), 1.74-1.42 (m, 6H). HR-ESI-TOF-MS: m/z 236.0238 ([M-H]⁻), calcd for [C₈H₁₄NOS₃]-236.0243.

Example 2

<Production of Lipoamide Trisulfide (Racemate)>

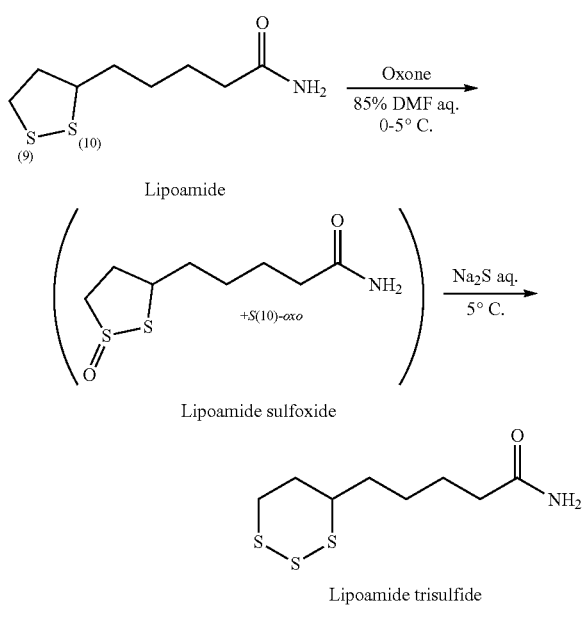

1.00 g (4.87 mmol) of lipoamide (racemate) and 182 mL (182.0 v/w) of an 85% dimethylformamide aqueous solution were added to a 500 mL four-neck flask. After confirming that the contents of the flask had dissolved, the internal temperature was cooled to 4° C. 1.63 g (4.89 mmol, 1.00 equivalent) of Oxone (registered trademark) was added to the flask in three portions every 10 minutes to cause a reaction for about 1 hour. 1.24 g (5.16 mmol, 1.06 equivalents) of sodium sulfide nonahydrate was added in portions at an internal temperature of 5° C. while controlling the pH of the reaction solution at 5 to 11 using a 3 mol/L sulfuric acid aqueous solution to cause a reaction for about 1.5 hours. 180 mL (180.0 v/w) of water and 50 mL (50.0 v/w) of methylene chloride were added thereto to perform extraction with methylene chloride. Then, the aqueous layer was extracted twice with 50 mL (50.0 v/w) of methylene chloride, and organic layers were combined and concentrated under reduced pressure at an external temperature of 30° C. or lower. 80 mL (80.0 v/w) of water was added dropwise to the concentrated residue over 30 minutes at room temperature for crystallization, and the slurry was filtered and then washed with 50 mL (50.0 v/w) of water. Wet crystals were dried under reduced pressure at 25° C. to obtain 510 mg of lipoamide trisulfide (racemate) (2.15 mmol, yield 44%, HPLC purity of 92%, white solid).

<Purity Test (HPLC) of Lipoamide Trisulfide>

Detector: Ultraviolet absorptiometer (measurement wavelength: 220 nm)
   Column: LiChrosorb RP-18 (Kanto Chemical Co., Inc., 4.0 mm I.D.×250 mm, 5 μm)
   Column temperature: Constant temperature around 40° C.
   Mobile phase A: Phosphoric acid aqueous solution (pH 3)
   Mobile phase B: Methanol
   Mobile phase delivery: The mixing ratio of the mobile phase A and the mobile phase B was changed as follows to control the concentration gradient.

TABLE 1

| Time after injection (minute) | Mobile phase A (vol %) | Mobile phase B (vol %) |
|---|---|---|
| 0 to 5 | 100 | 0 |
| 5 to 15 | 100 → 25 | 0 → 75 |
| 15 to 20 | 25 | 75 |
| 20 to 21 | 25 → 100 | 75 → 0 |
| 21 to 35 | 100 | 0 |

Flow rate: 1 mL/min
Injection volume: 10 μL
Area measurement range: 35 minutes after injecting sample solution
Holding time: lipoamide sulfoxide (12 to 13 minutes), lipoamide (about 17 minutes), and lipoamide trisulfide (about 19 minutes)

Example 3

<Production of (R)-Lipoic Acid Trisulfide-DEG Ester>

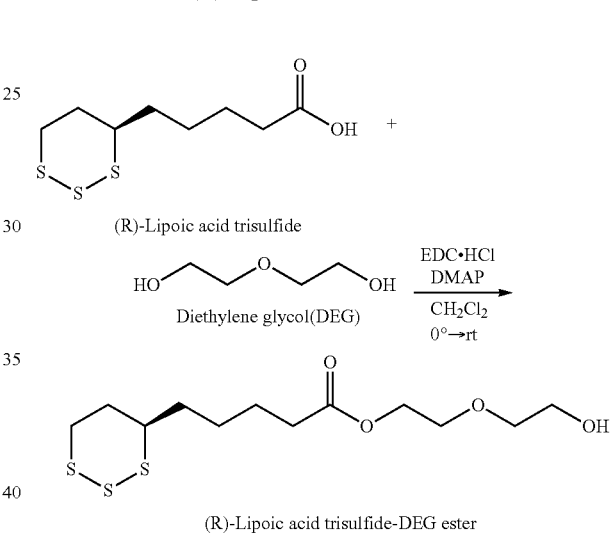

1.00 g (4.19 mmol) of (R)-lipoic acid trisulfide and 10 mL (10 v/w) of methylene chloride were added to a 50 mL three-neck flask. After confirming that the contents of the flask had dissolved, 256 mg (2.10 mmol, 0.50 equivalents) of 4-dimethylaminopyridine (DMAP), 885 mg (4.61 mmol, 1.10 equivalents) of 1-(3-dimethylaminopropyl)-3-ethylcarbodiimide hydrochloride (EDC·HCl), and 10 mL (10 v/w) of methylene chloride were added thereto. Thereafter, the temperature was cooled to 0° C., and 4.45 g (41.9 mmol, 10 equivalents) of diethylene glycol (DEG) and 5 mL (5 v/w) of methylene chloride were added thereto. After replacing the air in the flask with nitrogen, a reaction was carried out at room temperature overnight. Thereafter, at room temperature, the organic layer was washed once each with 20 mL (20 v/w) of a 1 moUL hydrochloric acid aqueous solution and 20 mL (20 v/w) of saturated sodium hydrogen carbonate aqueous solution and additionally washed once with 20 mL (20 v/w) of saturated saline. The organic layer was dried with sodium sulfate, filtered, and concentrated under reduced pressure, and then the concentrated residue was purified through column chromatography (mobile phase: hexane-ethyl acetate mixture). The fraction was concentrated under reduced pressure to obtain 924 mg (2.83 mmol, yield 67%, yellow oil) of (R)-lipoic acid trisulfide-DEG ester.

$^1$H-NMR: (CDCl$_3$, 400 MHz) δ (ppm)=4.25 (t, 2H, J=4.8 Hz), 3.74 (t, 2H, J=4.4 Hz), 3.71 (t, 2H, J=4.8 Hz), 3.61 (t, 2H, J=5.2 Hz), 3.51-2.90 (m, 2H), 2.36 (t, 2H, J=7.6 Hz), 2.32-2.10 (m, 2H), 1.90 (dt, 1H, J=13.2, 11.2 Hz), 1.74-1.34 (m, 6H).

Example 4

<Production of (R)-Lipoic Acid Trisulfide-Choline Ester>

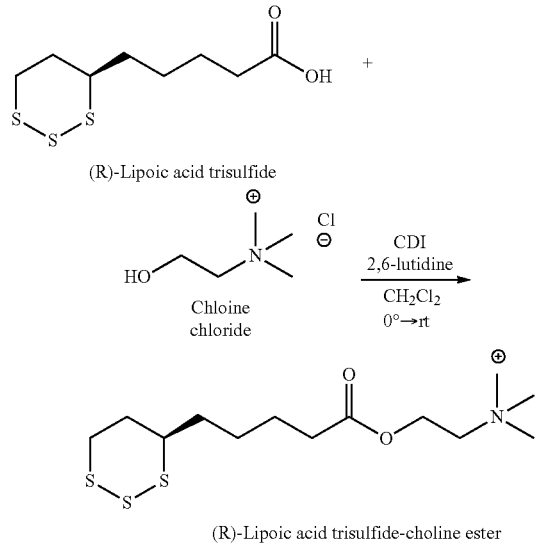

1.03 g (4.32 mmol) of (R)-lipoic acid trisulfide and 20 mL (19.4 v/w) of methylene chloride were added to a 100 mL four-neck flask and cooled to 0° C. After confirming that the contents of the flask had dissolved, 752 mg (4.64 mmol, 1.07 equivalents) of 1,1'-carbonyl diimidazole di(1H-imidazole-1-yl) methanone (CDI), 48 mg (0.45 mmol, 0.10 equivalents) of 2,6-lutidine, and 1.76 g (12.6 mmol, 2.92 equivalents) of choline chloride were added thereto. After replacing the air in the flask with nitrogen, stirring was performed at room temperature overnight. The resultant was filtered and concentrated under reduced pressure at an external temperature of 30° C., and then purified through column chromatography (mobile phase: dichloromethane-methanol mixture). The fraction was concentrated under reduced pressure to obtain 70 mg (4.32 mmol, yield 5%, white solid) of (R)-lipoic acid trisulfide-choline ester.

$^1$H-NMR: (CDCl$_3$, 400 MHz) δ (ppm)=4.61-4.44 (m, 2H), 4.14-3.97 (m, 2H), 3.76-2.87 (m, 12H), 2.38-2.24 (m, 2H), 2.24-2.06 (m, 1H), 1.82 (dt, 1H, J=12.8, 11.2 Hz), 1.67-1.23 (in, 6H)

Example 5

<Production of (R)-Lipoamide Trisulfide Derivative (I)>

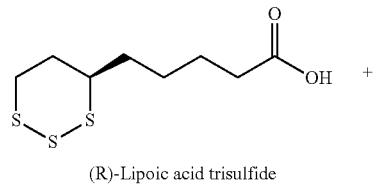

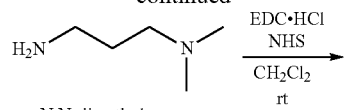

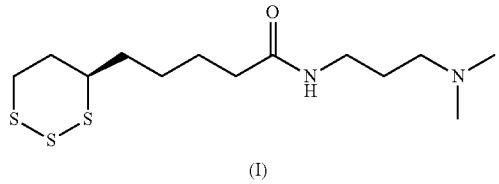

1.07 g (4.49 mmol) of (R)-lipoic acid trisulfide and 20 mL (18.7 v/w) of methylene chloride were added to a 100 mL four-neck flask. After confirming that the contents of the flask had dissolved, 969 mg (5.05 mmol, 1.13 equivalents) of 1-(3-dimethylaminopropyl)-3-ethylcarbodiimide hydrochloride (EDC·HCl), 581 mg (5.05 mmol, 1.12 equivalents) of N-hydroxysuccinimide (NHS), and N,N-dimethylpropane-1,3-diamine (12.8 mmol, 2.86 equivalents) were added thereto. After replacing the air in the flask with nitrogen, stirring was perfoimed at room temperature overnight. Thereafter, at room temperature, the organic layer was washed three times with 20 mL (18.7 v/w) of a saturated sodium hydrogen carbonate aqueous solution and washed three times with 20 mL (18.7 v/w) of saturated saline. The organic layer was dried with sodium sulfate, filtered, and concentrated under reduced pressure at an external temperature of 30° C., and then the resultant was purified through column chromatography (mobile phase: hexane-ethyl acetate mixture). The fraction was concentrated under reduced pressure to obtain 133 mg (0.41 mmol, yield 9%, yellow oil) of (R)-lipoamide trisulfide derivative (I).

$^1$H-NMR: (CDCl$_3$, 400 MHz) δ (ppm)=6.92 (bs, 1H), 3.51-3.00 (m, 4H), 2.37 (dd, 2H, J=6.0, 6.0 Hz), 2.36-2.10 (m, 9H), 1.90 (m, 1H), 1.70-1.35 (m, 9H).

Examples 6 to 12

Hereinafter, "HP", "Me", and "Mal" are respectively abbreviations for "hydroxypropyl", "methyl", and "maltosyl."

<Production of Lipoic Acid Trisulfide>

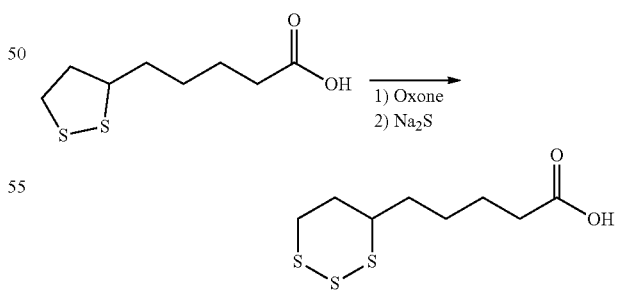

2.0 g (9.02 mmol) of lipoic acid and 40 mL of a 75% ethanol aqueous solution were added to a reaction container, and the mixture was cooled to an internal temperature of 0° C. 3.4 g (10.20 mmol) of Oxone (registered trademark) was added thereto to cause a reaction for about 2 hours. Inorganic salts in the reaction solution were filtered and then washed in 7 mL of ethanol. 5.8 g (24.1 mmol) of sodium sulfide nonahydrate was added to the filtrate to cause a reaction for about 1 hour. After 7 mL of a 3 mol/L sulfuric acid aqueous solution was added dropwise to this reaction solution, 20 mL of water and 45 mL of ethyl acetate (AcOEt) were subsequently added thereto to perform extraction with AcOEt. The aqueous layer was extracted twice with 20 mL of AcOEt, and organic layers were combined and concentrated under reduced pressure. After 3 mL of ethanol was added to the concentrate to dissolve it, the solution was purified with an ODS column (YMC Dispo PackAT, mobile phase: acetonitrile aqueous solution) to obtain 0.7 g (2.39 mmol, HPLC purity: 100%) of lipoic acid trisulfide.

<Production of CD Clathrate of Lipoic Acid Trisulfide>

Example 6: β-CD Clathrate of Lipoic Acid Trisulfide (Racemate)

1,020.0 mg (0.899 mmol) of β-CD and 80 mL of water were added to a 100 mL eggplant flask. After confirming that the contents of the flask had dissolved, 99.8 mg (0.419 mmol) of lipoic acid trisulfide was added thereto, and the inside of the flask was washed with 20 mL of water. The washed mixture was stirred at 45° C. for 15 minutes and then filtered, and the inside of the flask and the crystals were washed with 10 mL of water. The obtained filtrate was frozen in a −20° C. freezer for 23 hours. The frozen filtrate was freeze-dried at an external temperature of 20° C. for about 4.5 days to obtain 980.0 mg of a clathrate (white solid).

Example 7: HP-β-CD Clathrate of Lipoic Acid Trisulfide (Racemate)

1291.0 mg of HP-β-CD and 16 mL of water were added to a 50 mL eggplant flask. After confirming that the contents of the flask had dissolved, 100.0 mg (0.419 mmol) of lipoic acid trisulfide was added thereto. The mixture was stirred at room temperature for about 28 hours and then filtered, and the inside of the flask and the crystals were washed with 10 mL of water. The obtained filtrate was frozen in a −20° C. freezer for about 2 days. The frozen filtrate was freeze-dried at an external temperature of 20° C. for about 2 days to obtain 1330.0 mg of a clathrate (white solid).

Example 8: HP-β-CD Clathrate of (R)-Lipoic Acid Trisulfide 969.9 mg of HP-β-CD and 10 mL of water were added to a 50 mL eggplant flask. After confirming that the contents of the flask had dissolved, 100.3 mg (0.421 mmol) of (R)-lipoic acid trisulfide was added thereto, and the inside of the flask was washed with 4 mL of water. The washed mixture was stirred at room temperature for about 25 hours and then filtered, and the inside of the flask and the crystals were washed with 12 mL of water. The obtained filtrate was frozen in a −20° C. freezer for 15 hours. The frozen filtrate was freeze-dried at an external temperature of 20° C. for about 2 days to obtain 1040.0 mg of a clathrate (white solid).

Example 9: Me-β-CD Clathrate of Lipoic Acid Trisulfide (Racemate)

1,616.0 mg of Me-β-CD (mixture of several methylated) and 12 mL of water were added to a 50 mL eggplant flask. After confirming that the contents of the flask had dissolved, 101.0 mg (0.424 mmol) of lipoic acid trisulfide was added thereto, and the inside of the flask was washed with 4 mL of water. The washed mixture was stirred for 21 hours and then filtered, and the inside of the flask and the crystals were washed with 12 mL of water. The obtained filtrate was frozen in a −20° C. freezer for 20 hours. The frozen filtrate was freeze-dried at an external temperature of 20° C. for about 4 days to obtain 1665.2 mg of a clathrate (white solid).

Example 10: ME-β-CD Clathrate of (R)-Lipoic Acid Trisulfide 1,616.0 mg of Me-β-CD (mixture of several methylated) and 16 mL of water were added to a 50 mL eggplant flask. After confirming that the contents of the flask had dissolved, 99.9 mg (0.420 mmol) of (R)-lipoic acid trisulfide was added thereto, and the inside of the flask was washed with 4 mL of water. The washed mixture was stirred at room temperature for about 6 hours and then filtered, and the inside of the flask and the crystals were washed with 13 mL of water. The obtained filtrate was frozen in a −20° C. freezer for 28 hours. The frozen filtrate was freeze-dried at an external temperature of 20° C. for about 3 days to obtain 1610.9 mg of a clathrate (white solid).

Example 11: Mal-β-CD Clathrate of Lipoic Acid Trisulfide (Racemate)

1,224.2 mg (0.839 mmol) of Mal-β-CD and 14 mL of water were added to a 50 mL eggplant flask. After confirming that the contents of the flask had dissolved, 100.4 mg (0.421 mmol) of lipoic acid trisulfide was added thereto, and the inside of the flask was washed with 2 mL of water. The washed mixture was stirred at room temperature for about 31 hours and then filtered, and the inside of the flask and the crystals were washed with 10 mL of water. The obtained filtrate was frozen in a −20° C. freezer for 22 hours. The frozen filtrate was freeze-dried at an external temperature of 20° C. for about 46 hours to obtain 1180.0 mg of a clathrate (white solid).

Example 12: Mal-β-CD Clathrate of (R)-Lipoic Acid Trisulfide 1,224.2 mg (0.839 mmol) of Mal-β-CD and 10 mL of water were added to a 50 mL eggplant flask. After confirming that the contents of the flask had dissolved, 100.1 mg (0.420 mmol) of (R)-lipoic acid trisulfide was added thereto, and the inside of the flask was washed with 5 mL of water. The washed mixture was stirred at room temperature for about 4.5 hours and then filtered, and the inside of the flask and the crystals were washed with 11 mL of water. The obtained filtrate was frozen in a −20° C. freezer for 24 hours. The frozen filtrate was freeze-dried at an external temperature of 20° C. for about 41 hours to obtain 1319.6 mg of a clathrate (white solid).

The yield and solubility of the clathrates obtained in Examples 6 to 12 are shown in Table 2.

TABLE 2

| | Lipoic acid trisulfide | | β-CD | | Clathrate (freeze-dried product) | | | |
|---|---|---|---|---|---|---|---|---|
| | | | | | | Content (%) | | |
| Example | Type | Solubility (g/L[1]) | Modification | Charge amount (w/w) | Percent yield (%)[2] | Actual measurement | Theoretical value | Solubility (g/L[3]) |
| 6 | Racemate | 0.1 | None | 10.2 | 84 | 8.6 | 8.9 | 0.77 |
| 7 | Racemate | 0.1 | HP | 12.9 | 94 | 7.1 | 7.2 | ≥49 |
| 8 | R body | 0.3 | | 9.7 | 99 | 9.6 | 9.4 | ≥65 |
| 9 | Racemate | 0.1 | Me | 16.0 | 96 | 5.8 | 5.9 | ≥50 |
| 10 | R body | 0.3 | | 16.2 | 99 | 6.1 | 5.8 | ≥41 |
| 11 | Racemate | 0.1 | Mal | 12.2 | 88 | 7.5 | 7.6 | ≥45 |
| 12 | R body | 0.3 | | | 105 | 8.0 | 7.6 | ≥52 |

[1] represents solubility in water at 20° C.
[2] Percent yield (%) = (yield × content)/theoretical yield × 100
[3] represents solubility of lipoic acid trisulfide in a clathrate in water at 20° C. A statement such as "≥49 g/L" indicates dissolution at 49 g/L.

Next, (R)-lipoic acid trisulfide contained in each of the clathrates obtained in Examples 8, 10 and 12 was tested for stability. In the stability test, some (samples) of (R)-lipoic acid trisulfide contained in each of the clathrates of Examples 8, 10, and 12 were allowed to stand at 40° C. for 3 months. At this time, a sample allowed to stand still under the conditions of light shielding and a sample allowed to stand without light shielding were prepared. After 3 months of standing, the content of each sample was examined by HPLC, and the proportion (residual rate) with respect to the content of each sample before standing was examined. β-CD, HP-β-CD, Me-β-CD, and Mal-β-CD were used as CDs. The results are shown in FIG. 1. "SSS" in the drawing is an abbreviation for "trisulfide."

The conditions of HPLC are as follows.

Detector: Ultraviolet absorptiometer (measurement wavelength: 220 nm)

Column: LiChrosorb RP-18 (Kanto Chemical Co., Inc., 4.0 mm I.D.×250 mm, 5 μm)

Column temperature: Constant temperature around 40° C.

Mobile phase A: Phosphoric acid aqueous solution (pH 3)

Mobile phase B: Methanol

Mobile phase delivery: The mixing ratio of the mobile phase A and the mobile phase B was changed as follows to control the concentration gradient.

TABLE 3

| Time after injection (minute) | Mobile phase A (vol %) | Mobile phase B (vol %) |
|---|---|---|
| 0 to 5 | 100 | 0 |
| 5 to 15 | 100 → 25 | 0 → 75 |
| 15 to 20 | 25 | 75 |
| 20 to 21 | 25 → 100 | 75 → 0 |
| 21 to 35 | 100 | 0 |

Flow rate: 1 mL/min

Injection volume: 10 μL

Area measurement range: 35 minutes after injecting sample solution

Holding time: Lipoic acid (about 18 minutes), lipoic acid trisulfide (about 20 minutes)

The invention claimed is:

1. A compound represented by Formula (1):

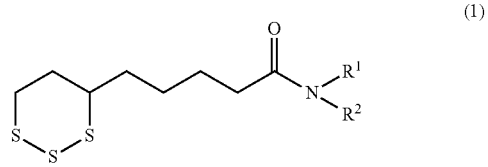

(1)

wherein $R^1$ and $R^2$ are each independently
 a hydrogen atom,
 a C1-6 alkyl group optionally having one or more substituents selected from the group consisting of a carboxy group and —$OR^5$,
 a C2-6 alkyl group having one or more substituents selected from the group consisting of —$NR^6R^7$ and —$N^+R^9R^{10}R^{11}$, or
 —$(CH_2CH_2O)_nR^8$,
 wherein $R^5$, $R^6$, $R^7$, $R^8$, $R^9$, $R^{10}$, and $R^{11}$ are each independently a hydrogen atom or a C1-3 alkyl group, and
 n is an integer of 2 to 5.

2. The compound according to claim 1, wherein $R^1$ and $R^2$ are each a hydrogen atom.

3. A compound represented by Formula (3):

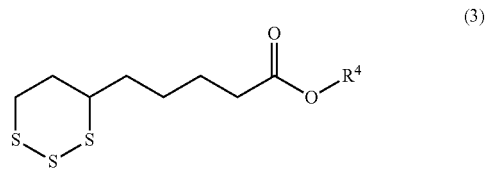

(3)

wherein $R^4$ is
 a C1-6 alkyl group having one or more substituents selected from the group consisting of a carboxy group and —$OR^5$,
 a C2-6 alkyl group having one or more substituents selected from the group consisting of —$NR^6R^7$ and —$N^+R^9R^{10}R^{11}$, or
 —$(CH_2CH_2O)_nR^8$,
 wherein $R^5$, $R^6$, $R^7$, $R^8$, $R^9$, $R^{10}$, and $R^{11}$ are each independently a hydrogen atom or a C1-3 alkyl group, and
 n is an integer of 2 to 5.

4. A cyclodextrin clathrate comprising a cyclodextrin and a compound selected from the group consisting of (a) a compound represented by Formula (1):

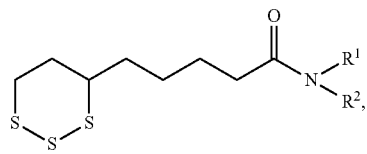

(b) a compound represented by Formula (2):

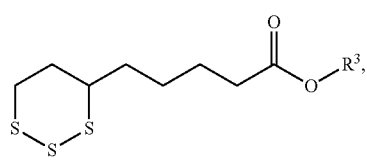

and (c) a salt of the compound represented by Formula (2), wherein $R^1$ and $R^2$ are each independently
- a hydrogen atom,
- a C1-6 alkyl group optionally having one or more substituents selected from the group consisting of a carboxy group and $-OR^5$,
- a C2-6 alkyl group having one or more substituents selected from the group consisting of $-NR^6R^7$ and $-N^+R^9R^{10}R^{11}$, or
- $-(CH_2CH_2O)_nR^8$, $R^3$ is
- a hydrogen atom,
- a C1-6 alkyl group optionally having one or more substituents selected from the group consisting of a carboxy group and $-OR^5$,
- a C2-6 alkyl group having one or more substituents selected from the group consisting of $-NR^6R^7$ and $-N^+R^9R^{10}R^{11}$, or
- $-(CH_2CH_2O)_nR^8$, $R^5$, $R^6$, $R^7$, $R^8$, $R^9$, $R^{10}$, and $R^{11}$ are each independently a hydrogen atom or a C1-3 alkyl group, and n is an integer of 2 to 5.

5. The cyclodextrin clathrate according to claim 4, wherein the salt of the compound represented by Formula (2) is a salt with an alkali metal, a salt with an alkaline earth metal, an ammonium salt, a salt with an inorganic acid, or a salt with an organic acid.

6. The cyclodextrin clathrate according to claim 4, wherein the cyclodextrin clathrate comprises a cyclodextrin and the compound represented by Formula (2), wherein $R^3$ is a hydrogen atom.

7. The cyclodextrin clathrate according to claim 4, wherein the cyclodextrin is selected from the group consisting of α-cyclodextrin, β-cyclodextrin, γ-cyclodextrin, and a derivative thereof.

8. The cyclodextrin clathrate according to claim 4, wherein the cyclodextrin is β-cyclodextrin or a derivative thereof.

9. The cyclodextrin clathrate according to claim 5, wherein the cyclodextrin clathrate comprises a cyclodextrin and the compound represented by Formula (2) or a salt thereof, wherein $R^3$ is a hydrogen atom.

10. The cyclodextrin clathrate according to claim 5, wherein the cyclodextrin is selected from the group consisting of α-cyclodextrin, β-cyclodextrin, γ-cyclodextrin, and a derivative thereof.

11. The cyclodextrin clathrate according to claim 6, wherein the cyclodextrin is selected from the group consisting of α-cyclodextrin, βB-cyclodextrin, γ-cyclodextrin, and a derivative thereof.

12. The cyclodextrin clathrate according to claim 9, wherein the cyclodextrin is selected from the group consisting of α-cyclodextrin, β-cyclodextrin, γ-cyclodextrin, and a derivative thereof.

13. The cyclodextrin clathrate according to claim 5, wherein the cyclodextrin is β-cyclodextrin or a derivative thereof.

14. The cyclodextrin clathrate according to claim 6, wherein the cyclodextrin is β-cyclodextrin or a derivative thereof.

15. The cyclodextrin clathrate according to claim 9, wherein the cyclodextrin is β-cyclodextrin or a derivative thereof.

* * * * *